United States Patent [19]
Ferrari

[11] Patent Number: 6,099,218
[45] Date of Patent: Aug. 8, 2000

[54] SNOWMOBILE TRAILER

[76] Inventor: Ricky J. Ferrari, 9 Second St. South East, Crosby, Minn. 56441

[21] Appl. No.: 09/126,653

[22] Filed: Jul. 31, 1998

Related U.S. Application Data

[60] Provisional application No. 60/061,023, Oct. 6, 1997.

[51] Int. Cl.[7] ............................................ B60P 3/06
[52] U.S. Cl. .......................... 410/7; 410/2; 410/3; 410/81
[58] Field of Search ................................. 410/2, 3, 4, 7, 410/9, 19, 77, 81

[56] References Cited

U.S. PATENT DOCUMENTS

| | | | |
|---|---|---|---|
| 3,672,523 | 6/1972 | Albert | 414/469 |
| 3,730,552 | 5/1973 | Clark | 410/3 |
| 3,885,690 | 5/1975 | Van Slambrouck | 414/485 |
| 3,912,139 | 10/1975 | Bowman | 410/3 |
| 4,222,698 | 9/1980 | Boelter | 414/477 |
| 5,005,846 | 4/1991 | Taylor | 280/30 |
| 5,044,845 | 9/1991 | Baker, Jr. | 410/3 |
| 5,203,655 | 4/1993 | Persau | 410/3 |
| 5,542,815 | 8/1996 | Roeling | 414/812 |
| 5,553,882 | 9/1996 | Unruh | 280/508 |
| 5,607,270 | 3/1997 | Zimmerman | 410/3 |
| 5,785,471 | 7/1998 | Godbersen | 410/2 |
| 5,816,757 | 10/1998 | Huston | 410/3 |
| 5,902,081 | 5/1999 | Zizzi | 410/3 |

OTHER PUBLICATIONS

Picture of a snowmobile trailer manufactured by Range Manufacturing Company and sold in the United States prior to Oct. 6, 1966.

*Primary Examiner*—Lanna Mai
*Assistant Examiner*—Andrew J. Fischer
*Attorney, Agent, or Firm*—Burd, Bartz & Gutenkauf

[57] ABSTRACT

A snowmobile trailer with an open, flat trailer bed and hold down assemblies to accommodate one or two snowmobiles. The hold down assemblies include hold down brackets fixed to the trailer bed and laterally aligned across it. The brackets are spaced back from the front edge of the trailer bed a sufficient distance so that the struts holding the snowmobile runners are located between the brackets with the bottoms of the snowmobile skis in full contact with the trailer bed. Hold down rods extend between the hold down brackets and cooperate in pairs to straddle the snowmobile struts to restrain the snowmobiles from movement on the trailer.

7 Claims, 3 Drawing Sheets

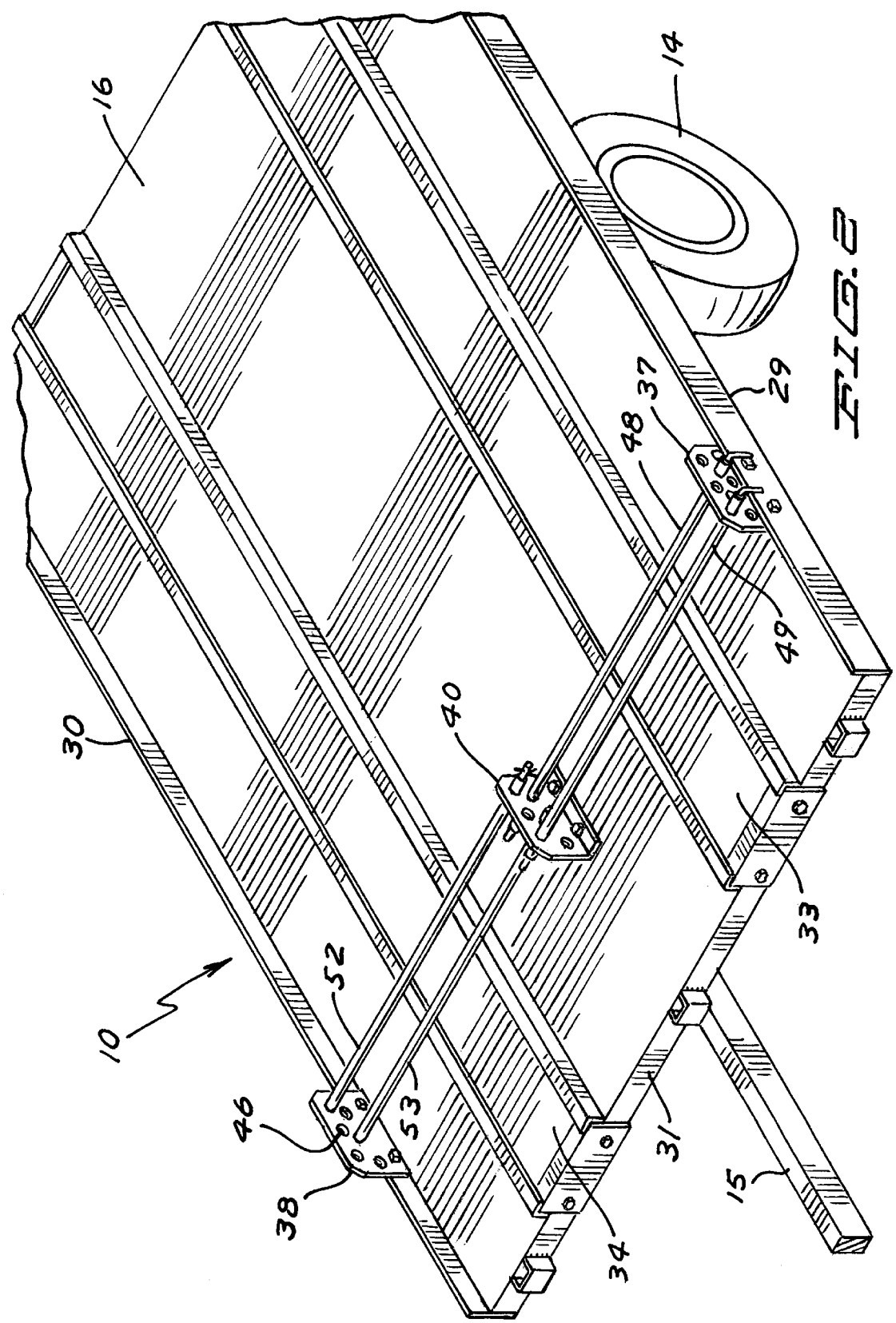

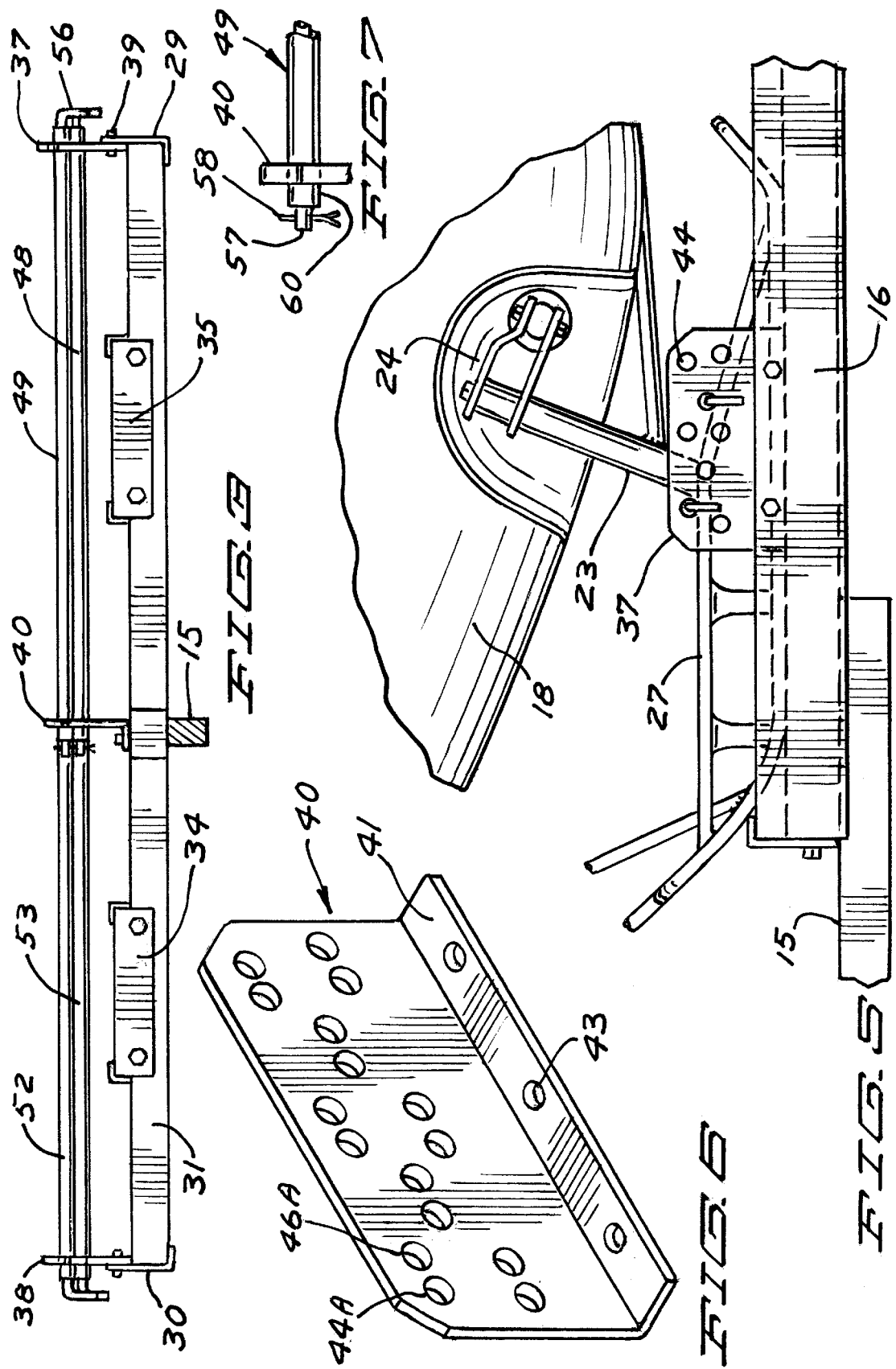

SNOWMOBILE TRAILER

CROSS REFERENCE TO RELATED APPLICATION

This application claims the benefit of U.S. provisional application No. 60/061,023 filed Oct. 6, 1997.

BACKGROUND OF THE INVENTION

Snowmobiles are typically transported from place to place on trailers towed behind a vehicle. Specialized trailers have been devised specific to the task of transporting the snowmobile. One particular snowmobile trailer has a flat open bed with a hold down assembly attached near the front edge of the trailer bed to engage forward portions of the snowmobile runner assemblies. The hold down assembly includes brackets attached to either side of the trailer bed near the front edge. The brackets have aligned openings. A single hold down rod is trained through aligned openings of the brackets. The rod is spaced rearwardly of the leading edge of the trailer bed only a sufficient distance to enable engagement of structural components of the runner assembly of the snowmobile forward of the struts or legs that hold the runner assembly to the snowmobile body. The hold down rod is passed through the front portion of the runner assemblies of the snowmobile. The rod passes through openings in ribs attached to the top of the skis of the runner assembly and just above the ski surface. These hold down rod systems have the disadvantage of holding the snowmobile down to the trailer at a point that is very forward on the snowmobile and low on the trailer bed. These rod systems lack versatility. They rely upon the existence of correctly located openings in the runner assemblies.

SUMMARY OF THE INVENTION

The invention relates to an improved snowmobile trailer having an open flat trailer bed and a hold down rod assembly for engagement of the runner assemblies of the snowmobile. The hold down assembly has a pair of rods that extend in straddling relationship to the struts that hold the runner assemblies to the snowmobile chassis. The rods extend between side brackets mounted to the trailer bed. A preferred embodiment of the trailer can accommodate two snowmobiles. Side brackets are fixed to either side of the trailer bed. A central bracket is fixed centrally to the trailer bed in alignment with the side brackets. The brackets have several aligned hole patterns for adjustment of the position of the hold down rods according to the particular snowmobile. The rods are spaced farther back and higher with respect to the snowmobile than those of the prior art. The snowmobile has greater stability on the trailer.

IN THE DRAWINGS

FIG. 2 is a perspective view of the snowmobile trailer of FIG. 1 without the snowmobile;

FIG. 3 is an enlarged front plan view of the trailer bed of the trailer of FIG. 2;

FIG. 5 is a side elevational view of the snowmobile and trailer portions of FIG. 4;

FIG. 6 is a perspective view of one of the central mounting plates of the snowmobile trailer; and FIG. 7 is an enlarged view of an end of one of the hold down rods of the hold down assembly of the snowmobile trailer of the invention.

DESCRIPTION OF A PREFERRED EMBODIMENT

Figure 1:
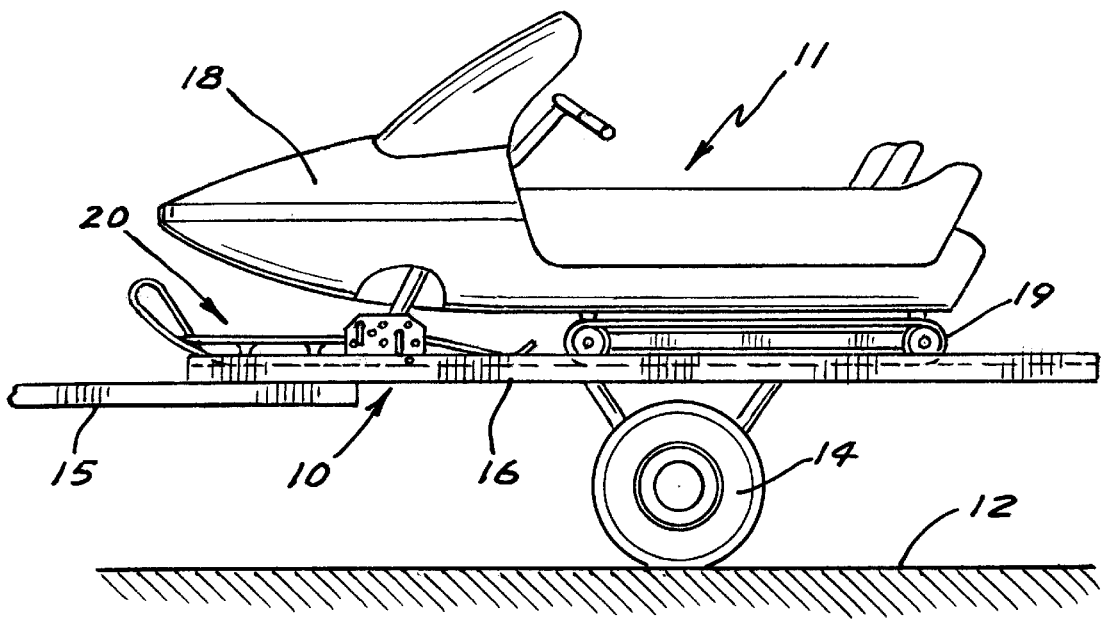
FIG. 1 is a side plan view of a snowmobile mounted on a snowmobile trailer according to the invention.

Referring to the drawings, there is shown in FIG. 1 a snowmobile trailer 10 according to the invention carrying a snowmobile 11 for transport over a road surface 12. The snowmobile trailer 10 has conventional wheels 14 and a forwardly directed tongue 15 for connection to the towing vehicle. The trailer 10 also includes the usual flat trailer bed 16.

The snowmobile 11 has a snowmobile body or chassis 18. A snowmobile track 19 is mounted rearwardly of the chassis 18. Snowmobile runner assemblies 20 are connected to the front of the machine.

Figure 4:
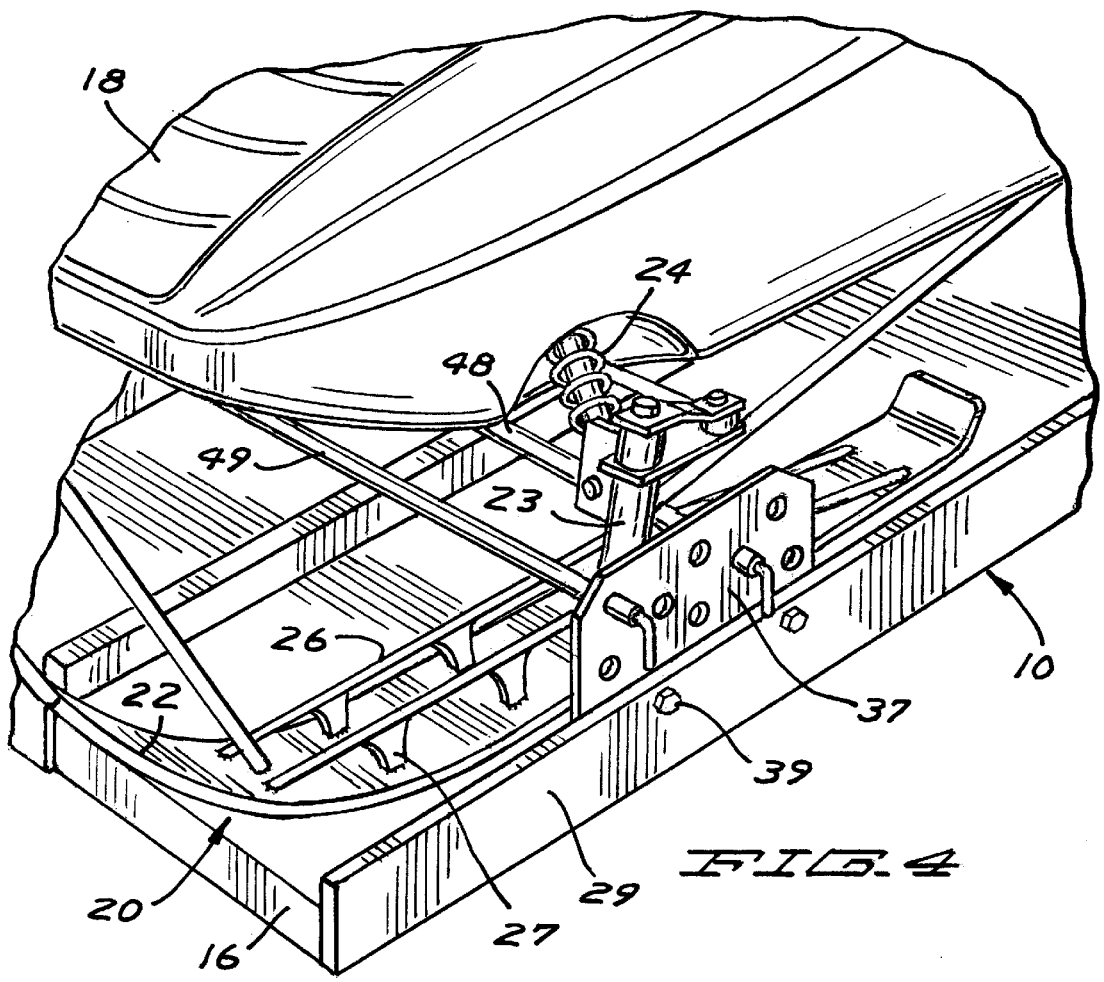
FIG. 4 is an enlarged perspective view of the front left corner of the snowmobile and trailer of FIG. 1 showing the snowmobile secured to the trailer bed.

As shown in FIG. 4, a runner assembly 20 includes a snowmobile ski 22 having a upwardly curved forward tip. A strut 23 is connected to the top of the ski 22 and is assembled by a suspension assembly 24 to the snowmobile body 18. Ribs 26 are fastened to the ski 22 for purposes of strength and extend parallel to it. Legs 27 secure ribs 26 to the ski 22.

Referring to FIG. 2, snowmobile trailer 10 has a left longitudinal side frame member 29 and a right longitudinal side frame member 30 and a lateral forward edge 31 all peripheral to the trailer bed 16. Snowmobile trailer 10 is adapted for accommodation of two snowmobiles in side by side relationship. Trailer 10 has a first raised platform 33 that extends lengthwise of trailer bed 16, and a second raised platform 34. These platforms are located intermediate the trailer width and are to accommodate the track 19 of the snowmobile with the runner assemblies located on either side of the platform.

A left hold down bracket 37 is fixed to the left frame member 29, and a right hold down bracket 38 is fixed to the right longitudinal frame member 30. Bolts 39 hold the brackets 37, 38 in place with respect to the respective side frame members.

A central bracket 40 is installed on trailer bed 16 between the left and right brackets 37, 38. As shown in FIG. 6, the central bracket 40 has a horizontal foot 41 that is fixed to the trailer bed 16.

Each of the hold down brackets 37, 38, 40 includes a flat plate with a vertical planar surface perpendicular to bed 16 and parallel to the side frame members 29, 30. The brackets are substantially aligned across the width of the trailer bed. The brackets have laterally aligned openings for receipt of hold down rods that cooperate in pairs to secure the snowmobile to the trailer bed.

As shown in FIG. 5, the left hold down bracket 37 has a pattern of holes or openings 44 consisting of top, intermediate and bottom rows of holes or openings 44 (three in the top row, two in the middle row, and three in the bottom row). Central bracket 40 has a corresponding pattern 44A of holes, such that each hole 44 in the bracket 37 has a corresponding one in the bracket 40.

Right side bracket 38 (FIG. 2) has a pattern of openings 46 like the pattern of openings in the bracket 37, but longitudinally offset a slight distance. The central bracket 40 has a corresponding pattern of openings 46A corresponding on a one to one basis to the openings 46 in the right bracket 38. The patterns 44A, 46A of openings in the bracket 40 are offset as shown to avoid interference.

The hold down brackets are strategically positioned with respective holes therein aligned and positioned to accept hold down rods in pairs cooperating to hold down the front end of snowmobiles. The brackets are positioned in order to accommodate hold down rods that operate in pairs to straddle the snowmobile struts that assemble the runner assemblies to the snowmobile body. The brackets are positioned rearward of the front edge of the trailer bed such that the bottom of each ski is in full contact with the trailer bed with the struts positioned between hold down brackets. This relationship is clearly seen in FIG. 5.

By way of example, the top edges of the hold down brackets can be six and a half (6½) inches above the surface of the trailer bed. The top row of holes can be centered one inch beneath the top edges of the brackets; the middle row 1⅞ inches; and the bottom row 2¾ inches. The particular relationship of the holes is shown in FIG. 6 with respect to the central bracket 40. Openings in the middle row are offset from those in the top and bottom rows to avoid interference. Numerous holes are provided in order to accommodate snowmobiles of various sizes and designs.

By further way of example, the leading edges of the hold down brackets can be spaced from the front edge 31 of the trailer bed 16 by a distance of 9 inches to 15 inches.

FIGS. 2 and 4 show a first pair of hold down rods including first and second hold down rods 48, 49. Hold down rods 48, 49 extend between the left side bracket 37 and the central bracket 40. Hold down rods 48, 49 engage aligned holes in each of the brackets. The hold down rods 48, 49 straddle the strut 23 on the left side of snowmobile 11 as well as the corresponding strut on the other side (not shown). The rods are positioned above the ribs 26 on the skis 22. Aligned holes in the hold down brackets 37, 40 are chosen for accommodation of the rods 48, 49 such that the rods will pass closely over structural elements of the runner assemblies of the snowmobile.

A second pair of hold down rods is provided on the opposite side of the trailer bed. As shown in FIG. 2, a second pair of hold down rods includes third and fourth hold down rods 52, 53. The third and fourth hold down rods extend between the right side bracket 38 and the central bracket 40. The openings chosen in these brackets for accommodation of the rods will depend upon the particular structure of the runner assembly and struts of the snowmobile to be accommodated on the trailer.

Referring to FIGS. 3 and 7, by way of example, the hold down rod 49 comprises a linear member preferably made of metal, having an elbow end 56 that serves as a retention member and as a handle for insertion and withdrawal of the rod between the hold down brackets 37, 40. The linear portion of the rod 49 extends between the brackets. The tip 57 of the hold down rod extends outwardly of the central bracket 40 and carries a retainer pin or cotter pin 58 for purposes of securing the rod in place. The rod 49 carries a sheath 60 over the majority of the length thereof. The sheath 60 can be of a soft material such as rubber for purposes of interacting with the structural components of the snowmobile without leaving damage.

In use, one or two snowmobile are loaded onto the trailer bed. This is accomplished by means of a ramp or a tilt bed feature (neither of which is shown) or similar means. The snowmobile sits forwardly facing as shown in FIG. 1. The snowmobile is located such that the struts holding the runner assemblies to the snowmobile body are located between the mounting brackets. Hold down rods are then installed between the hold down brackets and secured by cotter pins. One hold down rod is located fore of the struts and the other aft. The hold down brackets are mounted on the trailer bed rearwardly of the front edge a distance purposefully chosen so that the struts are located between hold down brackets with the ski bottoms in full contact with the trailer bed as shown in FIG. 5. Openings in the brackets are chosen to place the hold down rods in close accommodation over the top of the runner assemblies and next to the support struts.

The hold down rods hold the snowmobile at a point beneath the suspension assemblies holding the runner assemblies. This lessens any propensity of the snowmobile to shift upon movement of the trailer 10 as when traveling up and down hills, around curves, over bumps, and upon abrupt stops. The snowmobiles are firmly held in place for transport to and from a place of usage.

What is claimed is:

1. A snowmobile and a snowmobile trailer with a hold down assembly for transport of one or two typical snowmobiles each having a snowmobile body, right and left runner assemblies connected by right and left struts to the snowmobile body at one end and to a ski of the runner assembly at the other end, said trailer including:

an open trailer bed with a lateral front edge and longitudinal right and left side edges, and having a width sufficient for accommodation of two snowmobiles;

a first side hold down bracket connected to the trailer bed proximate one longitudinal edge;

a center hold down bracket connected centrally to the trailer bed, laterally aligned with the first hold down bracket and spaced from it a distance approximately equal to the width of a snowmobile;

a second side hold down bracket connected to the trailer bed proximate the opposite longitudinal edge, laterally aligned with the central and first side hold down brackets;

each hold down bracket consisting of a flat plate with a planar surface perpendicular to the trailer bed and parallel to the side edges;

said first hold down bracket and center hold down bracket each having a first pattern of mutually aligned holes;

said second hold down bracket and center hold down bracket each having a second pattern of mutually aligned holes, said second pattern of holes on the center bracket being offset from the first pattern of holes;

a snowmobile carried on the trailer bed located between the center hold down bracket and the first side hold down bracket;

a first hold down rod extended between a first pair of mutually aligned holes of the first hole pattern of the first and center hold down brackets;

a second hold down rod extended between a second pair of mutually aligned holes of the first hole pattern of the first and center hold down brackets;

said first pair of holes of the first hole pattern on the first and center brackets positioned on the first and center brackets so that the first rod is extended between the first and center hold down brackets and positioned at a location just forward of the struts and above the runners of said snowmobile situated on the trailer bed between the first and center hold down brackets; and said second pair of holes positioned on the first and center hold down brackets so that the second rod is extended between the first and center hold down brackets and positioned at a location just rearward of the struts and above the runners of said snowmobile situated on the trailer bed between the first and center hold down brackets, such that the first and second rods straddle the snowmobile struts above the runners;

a third hold down rod extendable between a third pair of mutually aligned holes of the second hole pattern on the second and center hold down brackets;

a fourth hold down rod extendable between a fourth pair of mutually aligned holes of the second hole pattern on the second and center hold down brackets;

said third pair of holes of the second hole pattern on the second and center hold down brackets positioned on the second and center hold down brackets so that the third rod can be extended between the second and center hold down brackets and positioned at a location just forward of the struts and above the runners of a second snowmobile if a second snowmobile is situated on the trailer bed between the second and center hold down brackets; and said fourth pair of holes positioned on the second and center hold down brackets so that the fourth hold down rod can be extended between the center and second brackets and positioned at a location just rearward of the struts and above the runners of a second snowmobile if a second snowmobile is situated on the trailer bed, such that the third and fourth hold down rods will straddle the snowmobile struts above the runners;

said first, center and second hold down brackets being connected to the trailer bed at a location spaced rearwardly from the front edge of the trailer bed so that the bottoms of the skis of said snowmobile are in full contact with the trailer bed; and each hold down rod being comprised as an elongate member with a straight section that can extend between hold down brackets, an elbow at one end, and a removable retainer pin at the other end.

2. The snowmobile and trailer of claim 1 wherein:

each bracket has a hole pattern consisting of an upper, middle and lower row of holes.

3. The snowmobile and trailer of claim 2 wherein:

each bracket has a leading edge spaced from the front edge of the trailer by a mounting distance between nine inches and fifteen inches.

4. The snowmobile and trailer of claim 3 including:

a rubber sheath encasing at least part of each of the hold down rods.

5. The snowmobile and trailer of claim 4 including:

first and second raised longitudinal platforms on the trailer bed located centrally between the first and center hold down brackets, and the center and second hold down brackets respectively, positioned to carry the drive tracks of snowmobiles mounted on the trailers.

6. The snowmobile and trailer of claim 2 wherein:

the holes of the top row are centered about five and one half inches above the surface of the trailer bed.

7. The snowmobile and trailer of claim 6 wherein:

the holes of the middle row are centered about four and five-eights inches above the surface of the trailer bed.

* * * * *